Figure 1:
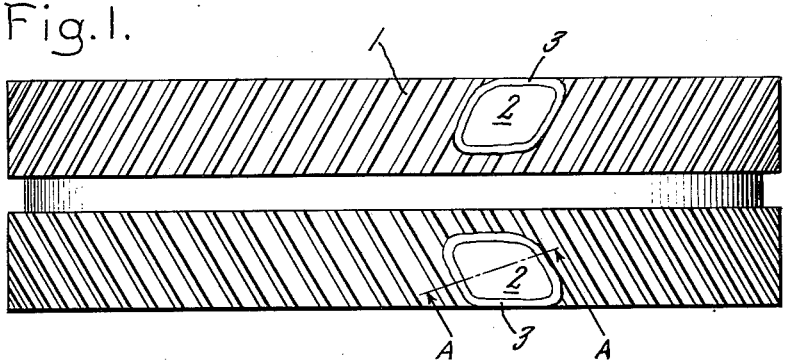

July 10, 1962   J. J. ZRODOWSKI   3,043,066
METHOD OF HONING A TOOTHED GEAR MEMBER
Filed Aug. 24, 1960

Inventor
Joseph J. Zrodowski
by Kiess
His Attorney

# United States Patent Office 3,043,066
Patented July 10, 1962

3,043,066
METHOD OF HONING A TOOTHED GEAR MEMBER
Joseph J. Zrodowski, Winchester, Mass., assignor to General Electric Company, a corporation of New York
Filed Aug. 24, 1960, Ser. No. 51,672
2 Claims. (Cl. 51—287)

This invention relates to the finish-grinding of the surfaces of gears or like toothed members, and more specifically to a method of making a special gear tooth hone for use in the precision finishing of such toothed members.

Large high-precision gears are currently being used extensively in propulsion systems for ships, where it is particularly important to obtain quietness of operation. In this service, it has been found that a primary cause for noise is the presence of very slight repetitive irregularities or "undulations" across the face surfaces of the gear teeth. These undulations are believed to be the result of exceedingly small deviations from optimum operating conditions of the precision gear finishing equipment, occurring at the time the gear is made. These undulations are generally "cyclic" because the uniform rotation of the gear cutter plus the uniform feeding of this tool creates a characteristic repetitive type of irregularity.

In order to correct these exceedingly small discrepancies in the gear teeth, it has previously been necessary to precision grind, hone, or lap the gear tooth surfaces in a large machine with an abrasive tool or lapping compound of some sort. In order to accomplish this precision honing, it has been necessary to remove the gear from the ship and return it to the factory, resulting in high costs both from the labor which must be utilized to remove and re-install the gear and also in the out-of-service time for the ship. In attempting to lap such gear surfaces, it has been found that often the layer of the lapping compound is thicker than the depth of the undulations, therefore any attempt to so grind the gears merely results in an overall wearing down of the gear surface, rather than a correction of the undulations.

Accordingly, it is an object of this invention to provide an inexpensive and simplified method for making a hone to be used for hand-honing gear teeth.

Another object of this invention is to provide a method of forming a cast hone specifically shaped for precision finishing a particular gear.

A more specific object is to provide a new tool and method for removing the very small deviations from the theoretically correct tooth surface which are repeated as "undulations" across the face width of the gear.

Further objects and advantages of this invention will become apparent and the invention will be better understood from the following description referring to the accompanying drawings, and the features of novelty which characterize this invention will be pointed out with particularity in the claims annexed to and forming a part of this specification.

In accordance with the invention, a plastic material which, when hardened, will form an abrasive honing tool, is cast or molded around a portion of the gear containing the defects to be removed. After the material is allowed to set or harden for a sufficient time, the hone thus formed is used by rubbing, either manually or mechanically, across the face of the gear, parallel to the teeth, with a slight, constant downward pressure to correct any irregularities on the face of the gear. In this manner, the gear is precision finished by a hone specifically cast to match the configuration of the defects in the particular gear, and without the cost of removing the gear from the machine in which it is installed.

Figure 2:
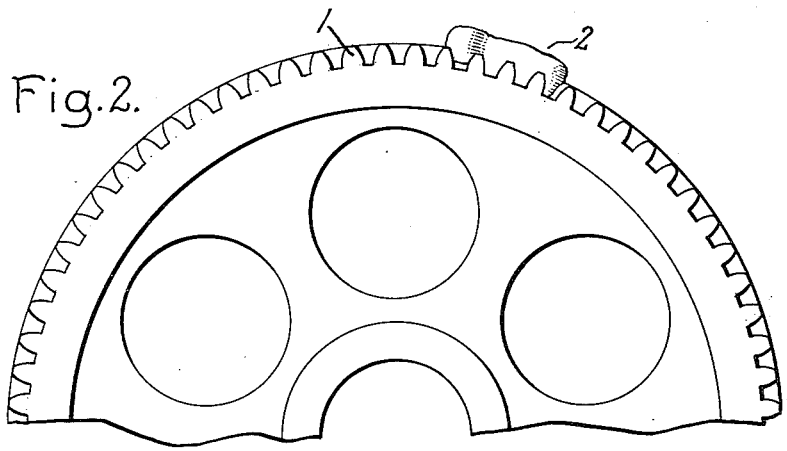
Figure 3:
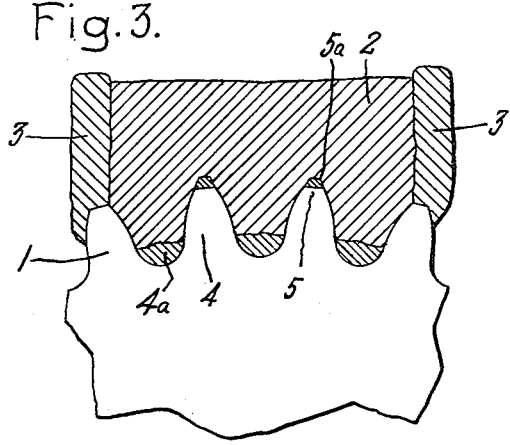

In the drawings,
FIG. 1 illustrates a large propulsion gear with cast honing tools situated thereon;
FIG. 2 illustrates a side view of FIG. 1; and
FIG. 3 illustrates a sectional view along the line AA of FIG. 1 showing the method of casting the hone on the gear surface.

Referring now more particularly to FIG. 1, there is shown a large herringbone gear as used for instance in a marine mechanical drive propulsion system. As noted before, this type of gear may cause an undesirable amount of noise unless the gear teeth are completely free of irregularities. Certain noise has been found to be caused by "undulations" or cyclic wave bands forming repetitive irregularities across the face width of the gear teeth. It has been found that by eliminating these very minute surface undulations, the noise level may be reduced considerably.

In accordance with the invention, these repetitive deviations from the correct tooth surface are removed by precision honing the gear teeth. The usual way to hone a gear is to remove the gear from the mechanism in which it is used and set it up on a complex gear finishing machine in the factory. This is prohibitively expensive where the gear is already installed in a ship, because of the tremendous expense of removing the gear from the engine room and taking the ship out of operation.

With the aid of the invention, the precision honing is accomplished without removing the gear. This is accomplished by molding the honing tool directly on the defective gear tooth surface, so the honing tool has a conjugate configuration to the defects to be corrected.

More specifically, a mold is formed by applying "dams" 3 to the gear tooth surface, encircling the area upon which it is desired to form the hone. The mold 3 may consist of any suitable material such as ordinary "modeling clay." After thus forming the mold 3, as illustrated in FIGS. 1 and 3, the interior surface of the mold is coated with any suitable "mold release" material. For instance, the silicone mold release fluids sold as No. 7 and No. 20 by the Dow-Corning Chemical Company may be used. Also, the mold release fluid sold as No. 225 by the Thalco Corporation of 765 S. Harvard Blvd., Los Angeles 5, California, may be employed. The function of this coating is to prevent the plastic resin material from bonding to the surface of the gear tooth. A liquid or fluent plastic resin, containing a suitable abrasive, is poured into the mold and caused to set around the gear teeth, as better illustrated in FIGS. 2 and 3. In casting the hone it is generally advantageous to encompass more than one gear tooth, as during the subsequent grinding operation, on small diameter gears, this prevents any "rocking" movement of the tool. However, in some cases, as in honing large gear teeth, this may not be necessary, and a hone encompassing a single tooth may be satisfactory.

The composition of this plastic abrasive material is preferably such that it will harden by catalytic action without the use of external heat and will form a solidified hone of a suitable composition to effect the precision grinding of the gear teeth surfaces. An example of such a composition is 400 grams of #60 grit, such as the fused alumina refractory material sold as "Alundum" by the Norton Company; 200 grams epoxy resin, such as Epon 828 (a condensation product of epichlorohydrin and bisphenol-A) and 50 grams of a curing agent such as "Type U," as sold by the Shell Chemical Company. "Type U" curing agent consists primarily of diethylenetriamine with some added Epon 828, the latter being also manufactured by the Shell Chemical Company. Generally speaking, from about 20 to 25 parts by weight of curing agent are used for 100 parts by weight of epoxy resin. Other suitable curing agents and resins for the present purpose will occur to those skilled in the art.

After the resin has solidified and cured (for at least eight hours), the mold is removed and the working surface of the hone etched with sulfuric acid to expose the abrasive grit particles, after which the honing operation may be effected, as follows.

The honing tool is soaked in kerosene, or an equivalent cutting fluid, and rubbed longitudinally along the gear tooth surfaces with a slight downward pressure to remove any irregularities or undulations in the teeth. Since these undulations are very minute in size, deviating perhaps only .00002 inch from the correct tooth surface, it may require only a few (perhaps only two or three) manual strokes of the hone to remove the irregularities. However, if a more extensive honing operation is required, the hone may be actuated by any suitable mechanical means such as a reciprocating air motor.

To prevent the honing tool from "bottoming," or grinding away the tip portions 5 or root portions 4 of the gear teeth, it may be advantageous to place a removable fillet material such as modeling clay on these portions of the gear teeth prior to casting the plastic abrasive material on the teeth, as illustrated at 4a, 5a in FIG. 3. In this manner, when the hone solidifies, clearance spaces are provided on the hone at the tip spaces 5a and root spaces 4a of the gear teeth to prevent this "bottoming" effect. Then, while the honing operation is being effected on the working surfaces of the gear teeth, the over-all configuration of the teeth is not altered.

From the foregoing it is apparent that I have provided a useful means of precision honing gears or the like in place, by providing a precision honing tool which may readily be molded or formed at the location where the gear is being utilized and directly on the gear, thereby making the precision finishing operation much simpler. It is apparent that since the gear does not have to be removed from the machine in which it is used, the over-all cost of this operation is greatly reduced by cutting down on the labor and "down time" of the machine.

Also, it can be seen that an advantage is derived from using a catalytic-hardening material for the hone, which does not require application of external heat, so there is no danger of deforming the gear by localized heating thereof. With other thermosetting or thermoplastic materials which either require heat to harden or else which require that the material be heated to cause it to flow sufficiently to be cast, there is some possibility of thermal deformation of the periphery of the gear in such a manner that when the hone solidifies on the heated gear portion it will not conform to the original gear tooth shape. This undesirable consequence is, of course, not encountered with the utilization of a honing composition which hardens by catalytic action. It should be understood, however, that this invention is not necessarily limited to the use of a resin hardened by catalytic action.

By molding the hone directly on the gear teeth, any undulations across the face of the tooth surface will cause mating or conjugate undulations to be formed on the honing tool. This use of a hone having a "conjugate" surface appears to be particularly effective to remove the undulation type of tooth surface defect.

A further use of such a hone is as an inspection tool to detect the presence of minute surface irregularities in such gears. At the present time, there is no convenient instrument available which will detect gear surface "undulations" on the order of 50 micro-inches or less. By casting a hone as herein described, and rubbing this tool over the gear tooth surface a few times, the "high" portions on the surface will assume a visible "polish." It has been found that the eye can thus readily detect extremely minute discrepancies in the vicinity of 10 to 20 micro-inches, thereby disclosing any need for further precision grinding. This visual inspection method may also be used to detect "high" portions too large to be removed by the hone. In such a case, the large defect is removed by conventional methods using hard abrasive stones or files, the cast hone being used for inspection purposes, and to effect the final finishing operation.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of my invention.

What I claim as new and desire to secure by Letters Patent of the United States is:

1. The method of honing a toothed gear member having root and tip spaces, comprising placing a removable fillet material on the root and tip spaces of at least two adjacent teeth of the member to be honed, casting an abrasive fluent composition directly onto said teeth, causing the composition to solidify to form a honing tool, removing the honing tool from the toothed member, removing the fillet material from root and tip spaces of the teeth, and effecting the honing of said toothed member by longitudinally moving said honing tool on the toothed member parallel to the teeth.

2. A method of honing toothed gear members comprising: providing a gear member having teeth defining working surfaces with periodically repetitive defects therein, casting an abrasive composition in a fluent state directly on the working surfaces of said teeth, confining said composition to said working surfaces, causing the abrasive composition to solidify to form a honing tool, and effecting the honing of said gear member by longitudinally moving said honing tool parallel to the teeth of the member.

References Cited in the file of this patent

UNITED STATES PATENTS

| | | |
|---|---|---|
| 151,847 | Cochran | June 9, 1874 |
| 1,924,380 | Rideout | Aug. 29, 1933 |
| 2,351,842 | Seibold | June 13, 1944 |
| 2,913,858 | Praeg et al. | Nov. 24, 1959 |
| 2,980,966 | Praeg | Apr. 25, 1961 |

FOREIGN PATENTS

| | | |
|---|---|---|
| 13,981 | Great Britain | Jan. 22, 1913 |

OTHER REFERENCES

Publication, "Epoxy Resins" by Skeist, copyright 1958 by Reinhold Publishing Corp., pages 18, 19 and 233. (Copy in Div. 60.)